Nov. 12, 1957  R. G. ESTEE ET AL  2,812,797
MACHINE FOR MAKING A FILAMENT REINFORCED LAMINATED FABRIC
Filed July 11, 1956  7 Sheets-Sheet 1
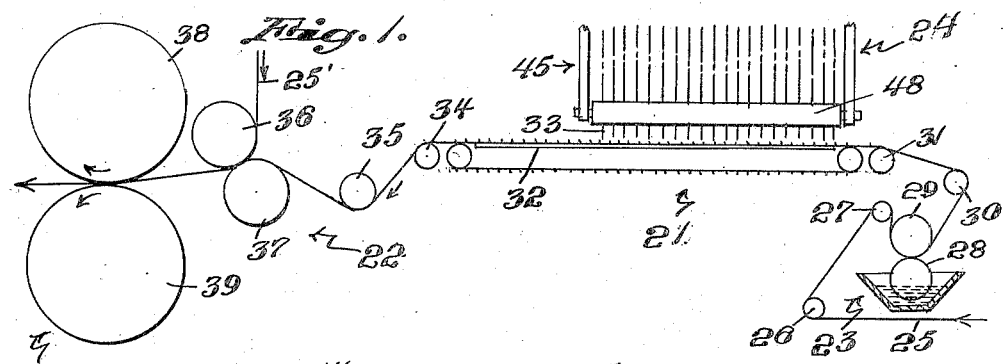
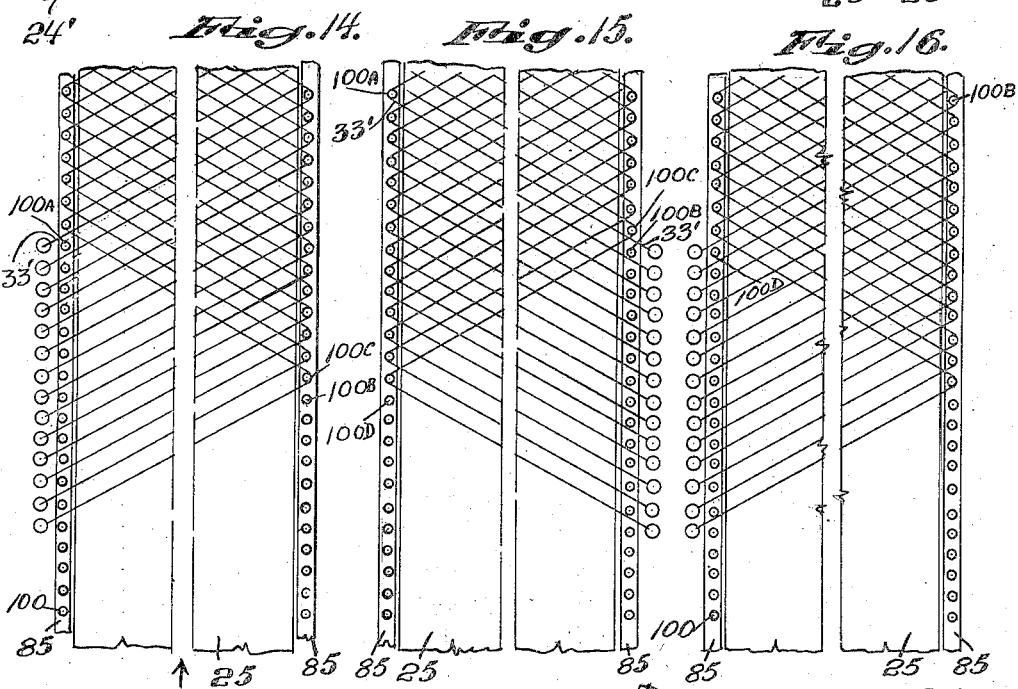
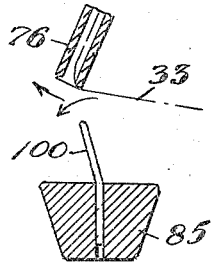
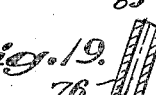
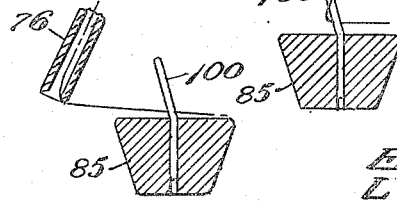
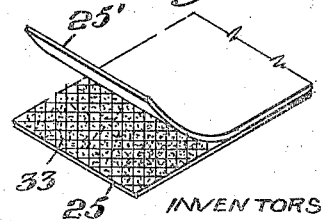
INVENTORS
Ralph G. Estee
Earl T. Bears
Edward J. Berry
Lloyd A. Sheeran
BY Barlow & Barlow
ATTORNEYS.

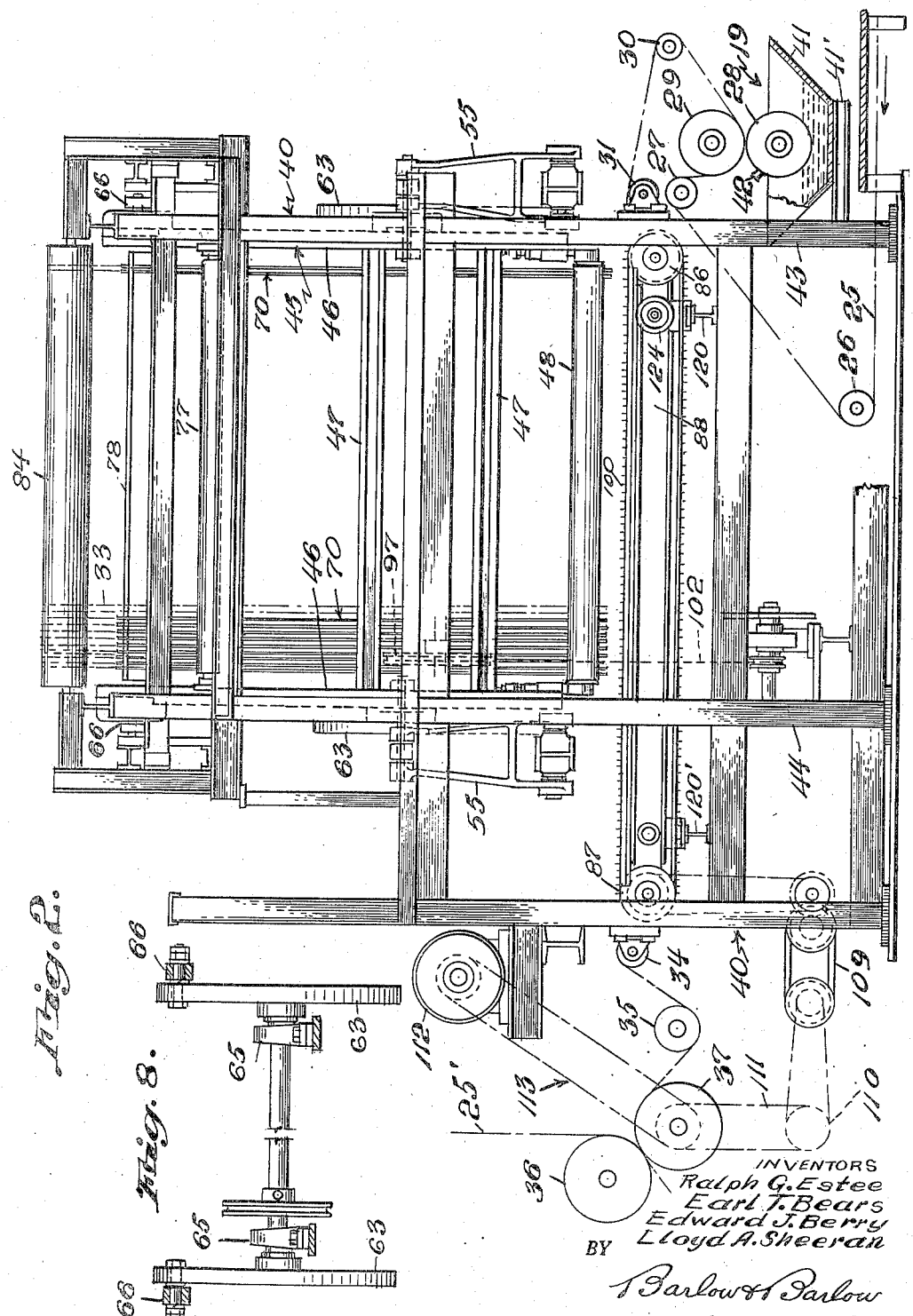

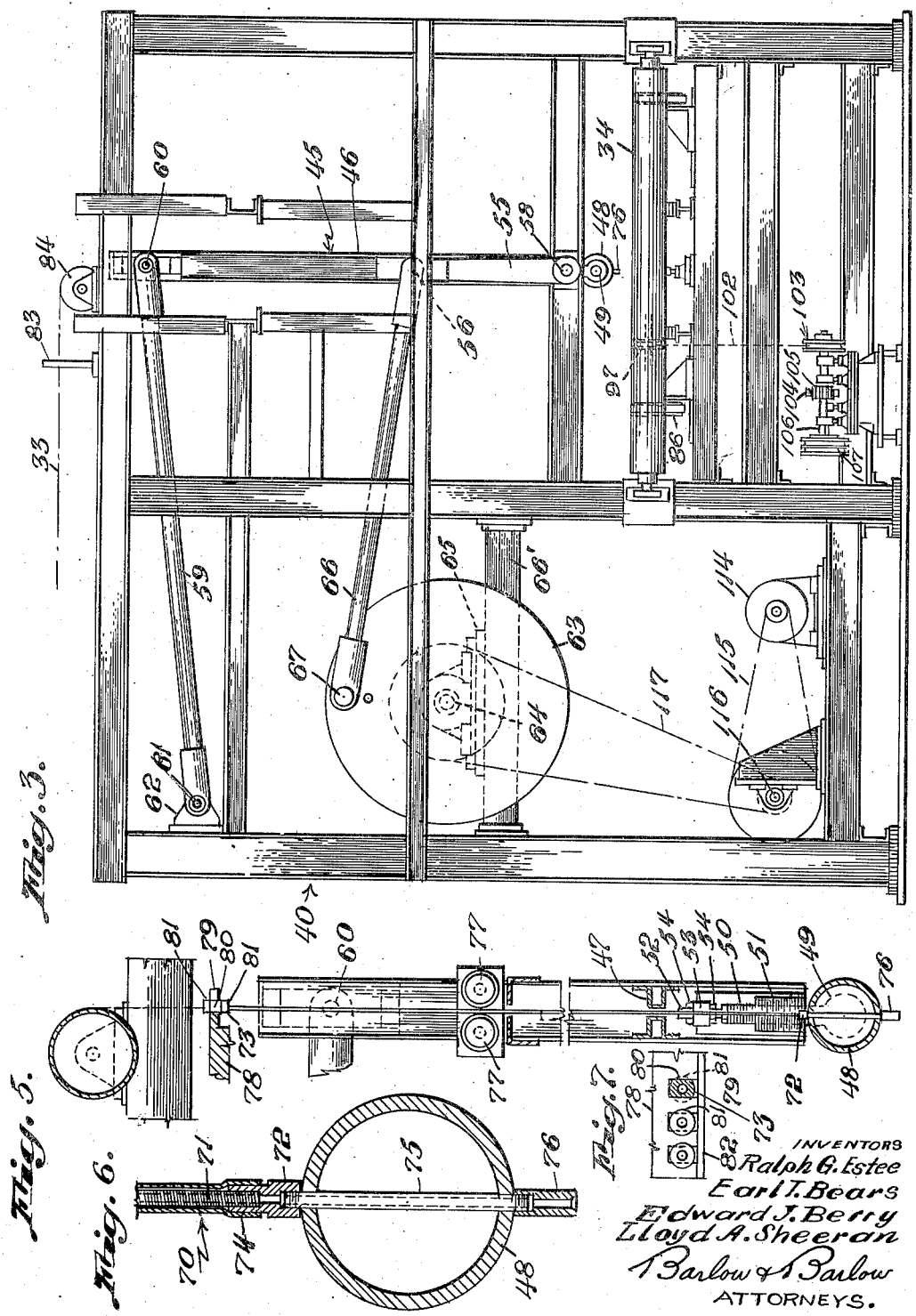

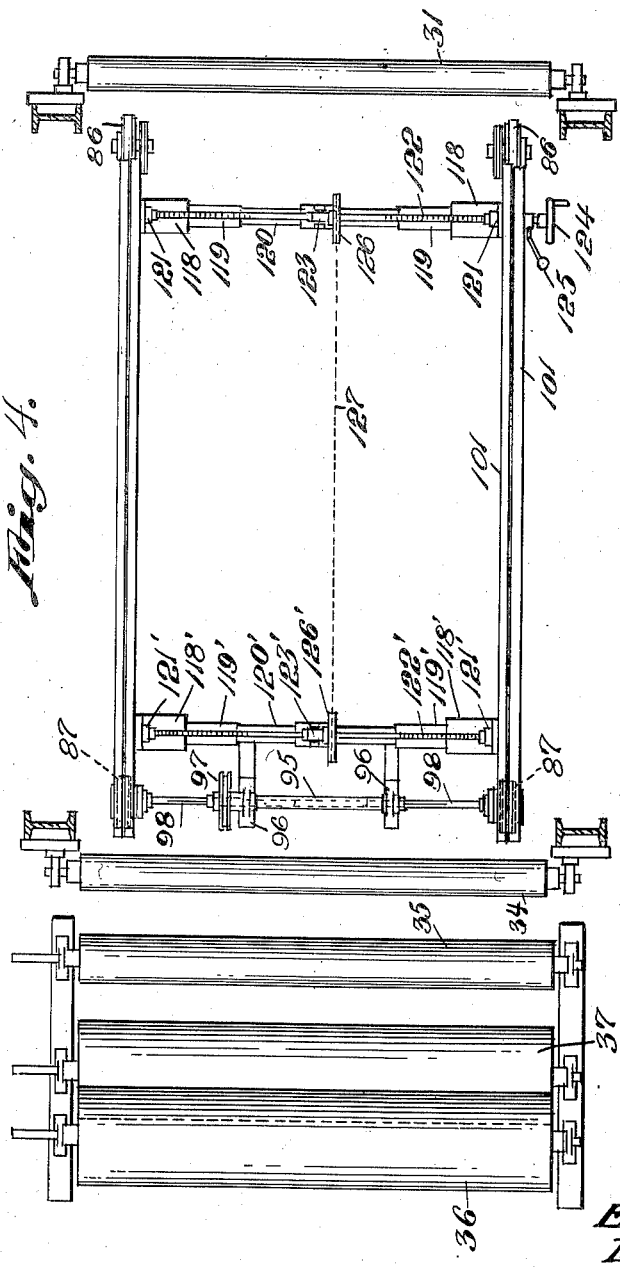

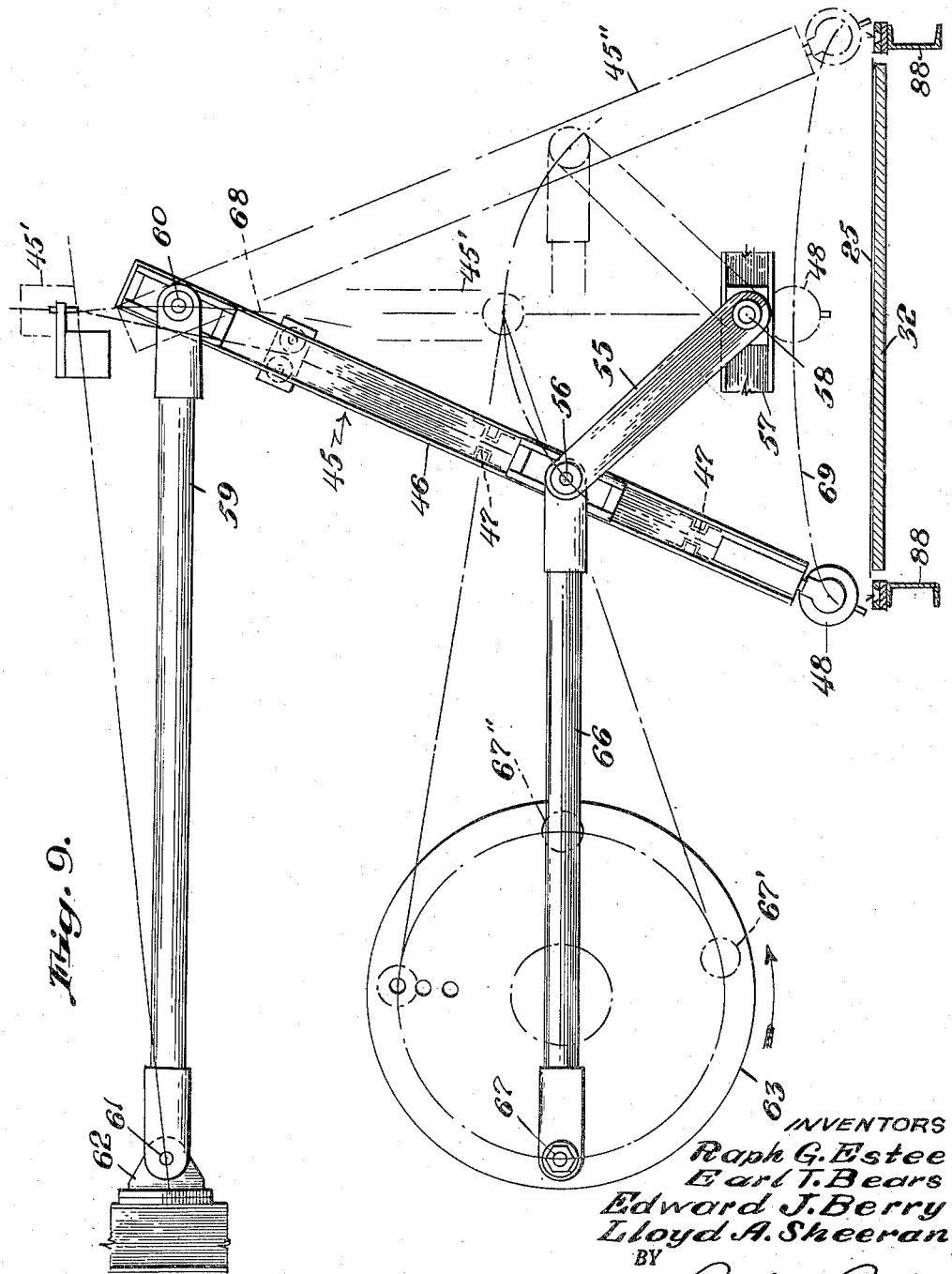

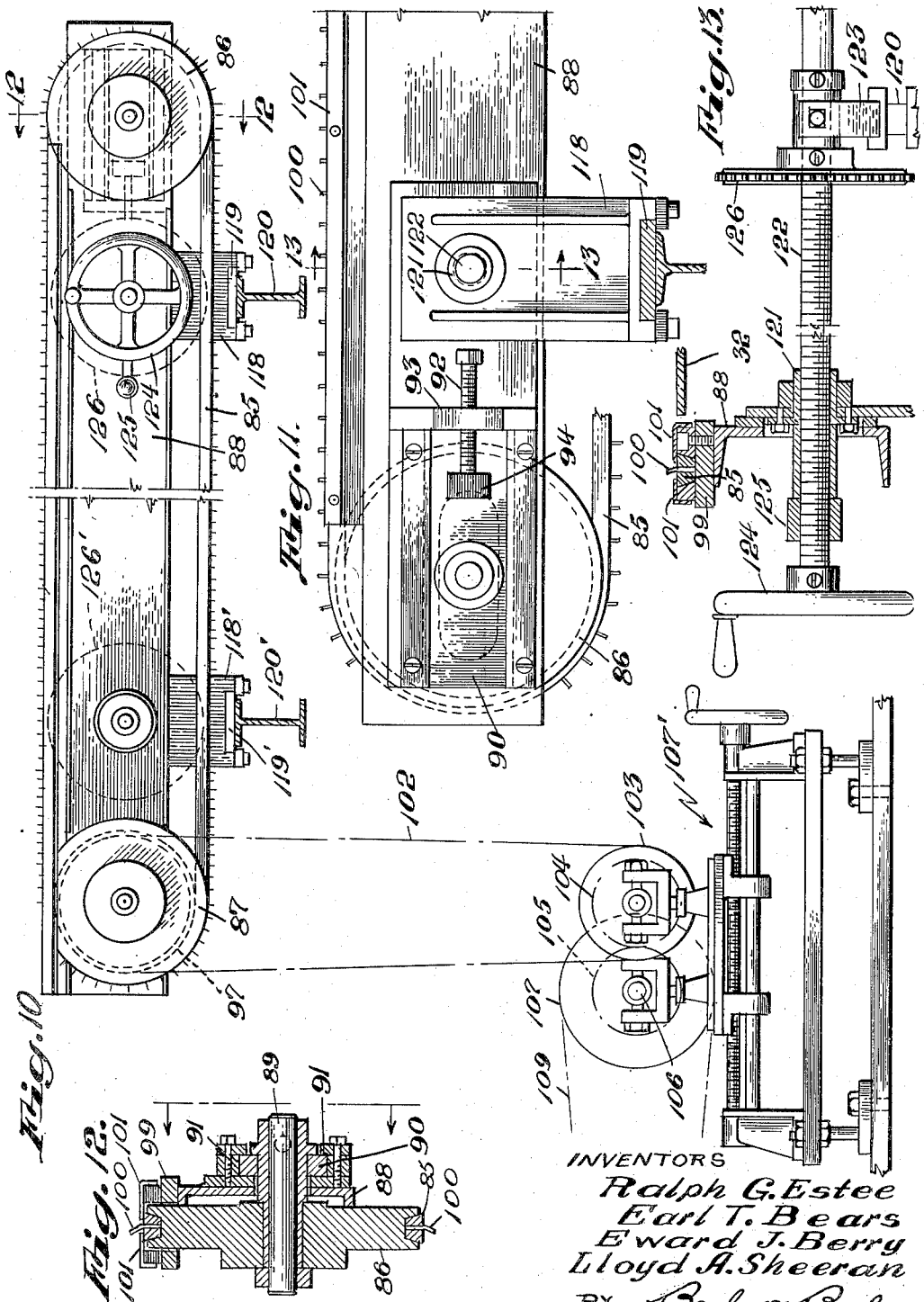

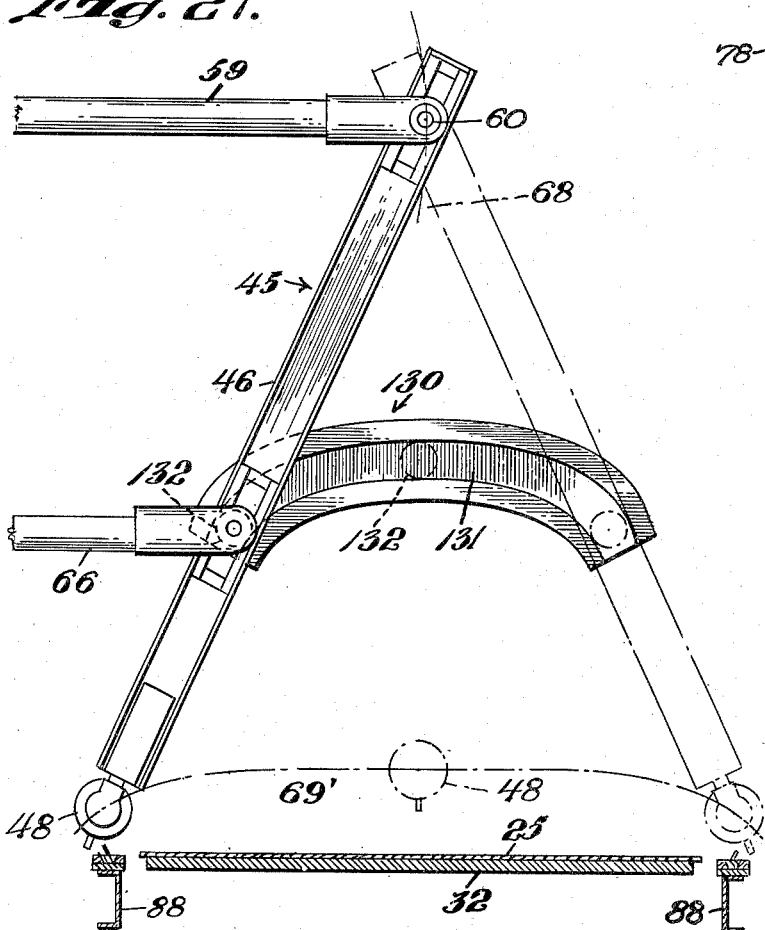
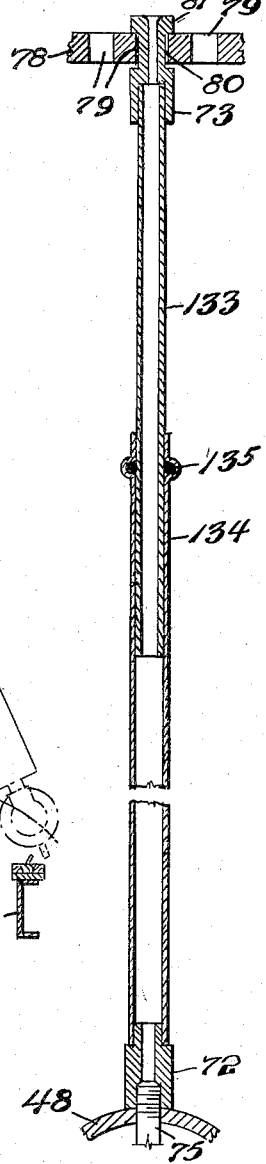

United States Patent Office 2,812,797
Patented Nov. 12, 1957

2,812,797

MACHINE FOR MAKING A FILAMENT REINFORCED LAMINATED FABRIC

Ralph G. Estee, Norton, and Earl T. Bears, Attleboro, Mass., and Edward J. Berry and Lloyd Alan Sheeran, Cranston, R. I., assignors to Glas-Kraft, Inc., a corporation of Massachusetts Application July 11, 1956, Serial No. 597,223

12 Claims. (Cl. 154—1.76)

This invention relates to an improvement in a machine for making laminated fabric in which a layer of continuous length filaments is laid across the fabric.

The fabric of the present invention comprises generally two webs of relatively thin and pliable sheet material, as for example paper, which are adhesively secured to each other and between which there is positioned a layer of continuous length of reinforcing filaments.

An object of the invention is to provide a machine for making the above fabric so constructed as to deposit a layer of continuous length filaments across the fabric, in which the filaments making up the layer are at predetermined equally spaced intervals therealong.

Another object of the invention is to provide a machine for making the above fabric which is so constructed as to deposit a layer of continuous length filaments across the fabric and across each other, in which the filaments of the layer are at predetermined equally spaced intervals.

A more specific object of the invention is to provide a machine which is so constructed as to automatically apply an adhesive to one side of one of traveling webs of sheet material, deposit a layer of reinforcing material in continuous length filament formed between the webs, and press the webs and filament layer therebetween into a laminated fabric.

Another object is to provide a laminated fabric having an intermediate layer of reinforcing material in continuous filament form.

With these and other objects in view, the invention consists of certain novel features of construction as will be more fully described and particularly pointed out in the appended claims.

In the accompanying drawings:

Figure 1 is a diagrammatic view illustrating a machine embodying the invention;

Figure 2 is a side elevational view of the machine illustrated in Figure 1;

Figure 3 is a rear end elevational view of the machine;

Figure 4 is a top plan view of a fragmentary portion of the machine;

Figure 5 is an end elevational view of the swinging frame of the machine;

Figure 6 is an enlarged sectional view of the lower end portion of the swinging frame of Figure 5;

Figure 7 is a top plan view of a fragmentary portion of the support for the filament guides;

Figure 8 is a front view of a crank mechanism for oscillating the swinging frame of Figure 5;

Figure 9 is a side view illustrating the oscillating motion of the swinging frame of Figure 5;

Figure 10 is a side elevational view of the filament holding pins carrying belt and supporting structure therefor and the drive mechanism;

Figure 11 is a view of the right end portion of Figure 10 but looking at the side opposite to that shown in Figure 10;

Figure 12 is a sectional view taken along line 12—12 of Figure 10;

Figure 13 is a sectional view taken substantially along line 13—13 of Figure 11;

Figures 14, 15, and 16 are similar top plan diagrammatic views illustrating the steps of laying a filament layer over a web;

Figures 17, 18, and 19 are similar views in section illustrating different relative positions of the filament traversing member and the pins about which the filaments are hooked;

Figure 20 is a perspective view of a fragmentary portion of the laminated fabric produced on the machine disclosed;

Figure 21 is a view partially in section of a modified construction of filament traversing member; and Figure 22 is a sectional view of a modified construction of filament guide.

In the embodiment disclosed, the machine designated 21 (see Figure 1) comprises broadly a feed mechanism 22 for advancing two webs of sheet material to be adhesively secured to each other, an adhesive applying mechanism 23 for coating one side of one of the webs, a mechanism 24 for laying an intermediate layer of reinforcing filaments, and a mechanism 24' for pressing the webs and intermediate filament layer into a fabric.

A web 25 of the sheet material, for example paper, is advanced from a suitable supply (not shown) usually in roll package form over guide rolls 26, 27 to between the bite of a pair of adhesive applying rolls 28, 29. The roll 28 is partially submerged in an adhesive at a temperature sufficient to maintain it in a fluid state so that it can be applied, which is picked up by the roll and deposited on the web 25. The web 25 with the adhesive coated side up is led from the rolls 28, 29 to pass over guide rolls 30, 31 to lead therefrom over a substantial long platform or similar flat support 32. During the passage of the web along the platform 32 a layer of continuous length of reinforcing filaments 33 is laid across the moving web by means of the mechanism 45. The web 25 with the filament layer thereon is guided from platform 32 over guide roll 34 and thence, if the adhesive is of a character that is heated, to beneath a heated roll 35 which reheats the adhesive which may have cooled in the travel of the web 25 from the location of the application of the adhesive thereto. After passing the heated roll 35, the second web 25' is advanced into contact with the first web and passed between the bite of feed rolls 36, 37 which pulls the webs through the machine. The two webs and intermediate layer of filaments are passed between the calender rolls 38, 39 of mechanism 24 of machine 21 to be pressed into the composite fabric previously described.

In the preferred embodiment (see Figures 2 and 3) the machine comprises an open framework designated in its entirety 40. This framework is composed of a plurality of uprights and horizontal cross beams which are formed of iron I-beams and channels suitably secured to each other so as to provide the proper rigidity for supporting the various different mechanisms of the machine. It may be here pointed out that the machine is of a relatively large size and the web of material treated may exceed as much as eight feet in width, if desired, and be made to travel through the machine at a velocity of five hundred feet per minute or more. At the right end of the framework as seen in Figure 2 and hereinafter referred to as the front end of the machine, a basin 41 is supported on horizontal members 41' and contains an adhesive which is maintained in heated condition by suitable means (not shown). The pair of rolls 28, 29 are mounted above the basin for free rotation and the roll 28 is partially submerged in the adhesive which is picked up thereby and the excess thereof being removed by a doctor blade 42 properly supported to extend axially of the roll 28 in a predetermined spacing therefrom. The adhesive is deposited on the web 25 which is guided as previously described to travel over the platform 32 (see Figure 1). The platform 32 extends from adjacent the front uprights 43 (see Figure 2) to adjacent the rear uprights 44 and provides a support to prevent sagging of the web between guide rolls 31 and 34.

The filament laying mechanism 24 comprises a swinging frame designated generally 45 (see Figures 2 and 9). This frame comprises side members 46 which are rigidly secured to each other by suitable cross members 47 and a header 48. The header (see Figure 5) is formed of a hollow cylinder, each end of which is closed by a plug 49 having a stem 50 which is slidable in a bracket 51 which is attached to the lower end of the frame 45. The stem has a threaded shank 52 which extends through a boss 53 on the bracket 51 which is screw threadedly engaged by nuts 54 positioned on opposite sides of boss 53. Thus, by adjusting the nuts 54 along shank 52, the header may be raised or lowered relative to the frame 45.

The frame 45 (see particularly Fig. 9) is pivotally secured at each side thereof to a lever 55 as at 56. The lever is pivotally secured at its other end to a horizontal main frame member 57 as at 58. Each side of the swinging frame is pivotally secured at the upper thereof to one end of a walking beam 59 as at 60. The other end of the beam is pivotally attached as at 61 to a stationary held bracket 62. A pair of crank wheels 63 (see also Figure 2) are mounted on a horizontal shaft (see Figure 3) which is journaled in bearings 65 secured to cross beams 66'. A connecting rod 66 has one end thereof eccentrically attached to the wheel 63 as at 67 and the other end thereof is pivotally secured to the pivot 56. Referring to Figure 9, it will be apparent that during the rotation of the crank wheels 63 in the direction indicated by the arrow, the pivot 67 will move from the full line position shown to the broken line position indicated 67'. The connecting rod 66 will have swung the frame 45 from the full line position shown to the broken line position indicated 45'. The upper end of frame 45 will have been carried upwardly through its connection with the walking beam 59 to the broken line position shown, the pivoted end 60 of the frame moving along the arc 68 described by the pivot 60 swinging about the fixed pivot 61. The lever 55 will now have reached high center of its arc of swing and further movement of the crank 63 in the same direction will cause the pivot 60 to move along the arc 68 in the reverse direction so that when pivot 67 has reached the position indicated 67'', the swinging frame will have been swung completely across the platform 32 to the broken line position indicated 45''. Equal increments of movement of the pivot 67 along its path of movement from the full line location shown to the broken line position 67' in conjunction with the movement of the upper end of the swinging frame along arc 68 will produce a progressively increasing lifting action on the swinging frame so that at the initial start of the swing of the frame from the full line position it will be gradual and in a lifting direction as indicated in the path of movement of the axis of the header as shown by broken line 69. From the above it will be apparent that near the ends of the stroke of the swinging frame, the speed thereof will be slackened and the lever will be moved in a path of smaller arc. In other words, at near the ends of the swing of the frame 45, the same will take a decided dip as indicated by line 69.

The swinging frame is provided with a plurality of equally spaced filament guides 70 (see Figures 5 and 6). These are flexible tubes 71 made of closely helically wound wire. The ends of these tubes are provided with attaching members 72, 73. A stretchable continuous wall tubular covering 74 is telescoped over tubes 71 and the ends thereof frictionally attached to the members 72 at one end and 73 at the other as shown in Figure 5. The header 48 is provided with a like number of tubular guides 75 (Figure 6) having threaded ends. These extend diametrically through the header 48 and the lower ends thereof each have a nozzle 76 screw threaded thereon, the upper end of each guide 75 being screw threadedly received in the attaching member 72. The guides 70 extend upwardly to between the cross members 47 and between a pair of rolls 77. A stationary support 78 (Figure 5) extends widthwise of the swinging frame 45 and has a plurality of slots 79 extending inwardly from one edge thereof in which slots the attaching members 73 are received, which members 73 are provided with a groove or flat sides 80 (Figure 7) which forms opposite shoulders to engage opposite sides of the support 78 so as to anchor the guide 70 to the said support. A bar 82 may be positioned across the opening ends of the slots to retain the members 73 in place. This, however, is not normally required in that the tension of the guide tends to hold the guides anchored against disengagement with support 78.

The filaments 33 are of continuous length and may be any suitable material but are preferably glass filaments. These are led from a source of supply (not shown) to be passed through a reed 83 (Figure 3) to maintain the same properly separated and led therefrom over a guide roll 84 and thence into the guides 70. The threading of the filaments through the guides 70 may be readily accomplished by the use of air under pressure to carry the filament through the said guides.

As may now be apparent, the frame 45 is caused to be swung or oscillated to and fro across the width of the web 25 as the same moves longitudinally through the machine and will carry the filaments from one side of the web to the other. In order to anchor the filaments 33 at the sides of the web, a pair of endless belts 85 (see Figures 10 to 13) are provided. These are positioned one at each edge of the path of travel of the web and parallel thereto. Each of these belts are similar and similarly mounted and only one need be described. The belt is of V shape and is trained over groove pulleys 86, 87 which are rotatably carried on a horizontally extending support 88. The pulleys 86 are mounted for free rotation on trunnions 89 (Figure 12) which are carried on slides 90 slidable in guide recesses 91. Each slide is adjustable by means of a screw threaded member 92 (Figure 11) which is screw threaded through a fixed abutment 93. The end of member 92 projects into engagement with a boss 94 fixedly secured to the slide 90. The pulleys 87 are drive pulleys and are rotated by means of a hollow shaft 95 (see Figure 4) which is journaled in bearings 96 and has a driven groove pulley 97 secured thereto for rotation with the shaft 95. Each pulley 87 is connected to said shaft 95 to be driven thereby by means of a secondary shaft 98 which is telescopically related to the shaft 95 and splined thereto for rotation therewith.

The upper stretch of the belt is supported against sagging by means of a plate 99 (Figure 13) which extends betweens the pulleys 86 and 87 and is secured to the upper edge of support 88. The belt is provided with a plurality of pins 100 which project outwardly and slant away from the path of movement of the web 25. Guards 101 on each side of the belt extend in overlapping relation therewith and form a longitudinal slot between which the pins of the upper stretch of the belt travel. The pins are spaced from each other a distance equal to the spacing between the guides 70. The belt travels at a rate equal to the rate of travel of the web 25 so that each pin 100 will travel in unison with a point opposite thereto on the web 25. The belts 85 are driven by means of an endless V belt 102 (Figure 10) which travel over grooved pulley 97 and driven pulley 103 which is connected through gears 104, 105 to the shaft 106 of an adjustable variable speed device indicated generally 107' having pulleys 107 secured to the shaft 106 and driven by an endless belt 109 trained over a driven pulley 110 in turn driven through a sprocket chain drive indicated generally 111 from the lower of feed roll 37. The feed roll 37 in turn is driven from an electric motor 112 through a sprocket chain drive 113. This provides for traveling the web and pins at a predetermined ratio of the speed of the crank wheels 63 which are driven from a separate power source including the motor 114 (Figure 3), sprocket chain drive 115 to shaft 116, and sprocket chain drive 117 to shaft 64 of the crank wheels 63.

It is desirable that the machine be adapted for use for various widths of web 25. To this end, the supports 88 are supported on brackets 118 (Figure 10) which are slidable on plates 119 attached to cross beams 120. The brackets 118 at the front end portion of the support 88 each carry a nut 121 (Figure 13) which is held against rotation. These nuts are positioned opposite each other and threadedly receive a threaded shaft 122 which is rotatively held against axial movement in a bearing 123 secured to the cross beam 120. The shaft 122 extends outwardly at the left side of the machine, as seen in Figures 2, 4, and 13, and has a hand wheel 124 mounted thereon for manual rotation of the shaft. A lock nut 125 secures the shaft against rotation. The brackets 118' (Figure 10) likewise carry nuts 121' (Figure 4) which are positioned opposite each other and threadedly receive a shaft 122' which is rotatively held against axial movement in a bearing 123' secured to the cross beam 120'. These shafts 122 and 122' are connected for rotation in unison by means of a sprocket chain drive comprising the sprocket gears 126, 126' and sprocket chain 127. Rotation of shaft 122 will be transmitted to shaft 122' and the supports 88 will be moved toward or from each other in parallel relation by reason of nuts 121, 121' being held stationary and advancing along shafts 122, 122'.

Assuming the machine to be in motion, the web 25 traveling through the machine, and the swinging frame 45 oscillating toward the left as viewed from the front end of the machine, at near the end of the stroke of the swinging frame the same will carry the filaments 33 slightly beyond the path of movement of the pins 100 (see Figure 14). The rate of travel of the web 25 and the rate of oscillation of the swinging frame are coordinated so that the filaments will be positioned in the spaces between the pins. The characteristic of the combined crank motion and walking beam hook-up, as previously described, will cause the swinging frame to take a sudden dip at near the end of the stroke thereof (Figure 9). This will position the ends of the nozzles 76 lower than the upper end of the pins 100 (Figure 18). The travel of the pins 100 will engage the filaments and carry the same forward, drawing the filament from nozzle 76. The swinging frame 45 will have started its swing towards the right to pass the filament through the next adjacent space and loop the filaments about the pins engaged (Figure 19). The outward slant of the pins and relative movement thereof to the frame 45 will retain the filaments engaged as the same are passed about the pins. During the oscillation of the frame 45 toward the right, the pin 100A about which the filament 33' has been looped will have been advanced to the position indicated in Figure 15 which is a distance equal to the distance between the end filaments carried by the swinging frame 45. The first free pin 100B next to the last hooked pin 100C will have been advanced to the position indicated in Figure 15 and will arrive at this position opposite to the nozzle in time for the filament 33' to be positioned in the space between pins 100B and 100C. The frame will now be caused to swing toward the left, which will loop the filament 33' about the pin 100B and the other filaments likewise about their respective pins, and another cycle of the swinging frame will take place as previously described.

It will be apparent that the travel of the pins 100 in relation to the swing of frame 45 will be such that the next to the last pin 100 engaged by a filament at one side of the web will be moved during the oscillation of the frame toward said side to be at a position opposite the leading filament to have said filament hooked thereabout. Thus, the leading filament will cross over the next adjacent filament, and the remaining filaments will likewise cross over the next adjacent filaments and form a layer of continuous filaments crossing over each other at a predetermined angle and spacing from each other. Figures 14 to 16 are more or less diagrammatic and only a few of a plurality of filaments 33 have been illustrated. In actual practice there will be many times this plurality of filaments, which plurality of filaments will to a degree control and determine the angle of crossing of one over the other. Thus, a swinging frame threaded with one hundred filaments will produce a more acute crossover angle than when the swinging frame is threaded with a greater number of filaments. As by way of example, a 30° angle cross-over may be had on a 61-inch wide web by threading the swinging frame with 227 filaments, spaced three per inch and with a proper relative speed of travel of pins and oscillation of the swinging frame.

The adhesive coated web and filament layer thereon will travel to the end of the upper stretch of the belts 85 and will sufficiently adhere to the web to be disengaged from the pins without materially disturbing the position thereof. As previously described, the web 25, the filament layer thereon, and the second web 25' will be guided to the calender rolls to be pressed into the laminated fabric shown in Figure 20.

It will be apparent from the description of the swinging frame and the manner in which the ends of the filament guides 70 are anchored that the swinging of the frame from the central position to either end of the swing of the frame will stretch the guides and build up potential energy in the guides 70. This potential energy in addition to the potential energy of the weight of the frame will at the reversal of the swing of the frame produce a kinetic force tending to pull or swing the frame in the same direction in addition to the force of the crank motion. The momentum of the swing of the frame gathered as moving toward center will carry the frame some distance past the center of swing to again build up potential energy in the frame and guides. Thus, a smooth reversal of direction of swing of the frame is had. The guides 70 additionally have a slow braking or retarding effect, which in conjunction with the particular crank motion additonally provides for a smooth oscillation of the swinging frame.

The webs 25 and 25' have been described as being paper. The webs may, however, be of different material; for example both webs may be paper or one web paper and the other metal, or the webs may be material other than paper. The filament may be any suitable material, preferably a glass filament.

In Figure 21 a track 130 is substituted for the link 55 of Figure 9. The track 130 has a guide groove 131 in which rides a roll 132 which projects from member 46. The groove 131 extends on a curvature which is generated to cause the leader 48 to travel in the path 69' which is similar to path 69 of Figure 9.

In Figure 22 the filament guide 70 comprises a pair of telescoping stiff tubes 133 and 134. The upper end of tube 133 is attached to member 73, and the lower end of tube 134 is attached to member 72. A seal 135 may be positioned between the telescoping surfaces of the tube so as to form an air seal to assure threading of the filament through the guide under air pressure. The upper end of frame 45 will swing in an arc 68 as previously described. The member 73 is, however, mounted rather loosely in slots 79 and provides clearance to permit a sufficient rocking of members 73 in the direction of swing of frame 45 to prevent bending of tubes 133 or 134. Thus, the rocking of member 73 will maintain the said tubes in straight line with each other so as to permit relative telescoping movement thereof in response to the changing distances in the travel of the header 48 in the path 69'.

We claim:

1. A machine for making a laminated fabric comprising means for advancing a web of sheet material through the machine, a swinging frame for traversing a plurality of continuous length filaments back and forth across said web during the traveling thereof, an endless belt at each side of said web carrying a plurality of pins about which the filaments are looped at each reversal of the traverse of the filament, said pins being held stationary on said belts, means for traveling said belts in unison with each other and at the rate of travel of said web, and means for guiding said frame across said web in a path having a dip at each end thereof so as to carry said filaments between said pins at a location inwardly of the upper ends of said pins.

2. A machine for making a laminated fabric comprising means for advancing a web of sheet material through the machine, a swinging frame mounted for swinging movement in generally vertical planes for traversing a plurality of continuous length filaments back and forth across said web, an extensible guide for each of said filaments carried by said swinging frame and movable therewith, an endless belt at each side of said web carrying a plurality of pins about which the filaments are looped at each reversal of the filament, said pins being held stationary on said belts, means for traveling said belts in unison with each other at the rate of travel of said web, and means for guiding said frame across said web in a path having a dip at each end thereof so as to carry said filaments between said pins at a location inwardly of the upper ends of said pins.

3. A machine according to claim 1 wherein said pins are slanted outwardly.

4. A machine for making a laminated fabric comprising means for advancing a web of sheet material through the machine, a swinging frame mounted for swinging movement in generally vertical planes for traversing a plurality of continuous length filaments back and forth across said web, a guide for each of said filaments carried by said swinging frame and movable therewith, each guide being extensible lengthwise thereof and having one end attached to said frame and the other end thereof attached to a stationary support dajacent the upper end of said frame.

5. A machine according to claim 4 wherein said filament guides are resiliently yieldable lengthwise thereof.

6. A machine according to claim 4 wherein said filament guides are tubular helically wound resilient wire attached at one end to said frame and at the other end to a stationary support at a position adjacent the upper end of said frame whereby said guides tend to urge said frame to return to its mid position.

7. A machine according to claim 4 wherein said frame has a pair of guide rolls and between which said filament guide extends.

8. A machine according to claim 4 wherein said guides are telescoping tubes.

9. A machine according to claim 1 wherein said frame is pivotally secured adjacent its upper end to a walking beam.

10. A machine according to claim 1 wherein said frame has one portion pivoted to a lever, the other end of which lever is pivoted to a stationary support, said swinging frame being pivotally connected at its upper end portion to a walking beam.

11. A machine according to claim 1 wherein said frame has one portion guided by a track.

12. A machine according to claim 1 wherein said frame has one portion guided by a track, said swinging frame being pivotally connected at its upper end portion to a walking beam.

References Cited in the file of this patent

UNITED STATES PATENTS

| | | |
|---|---|---|
| 1,211,851 | Howard | Jan. 9, 1917 |
| 1,923,710 | Collings et al. | Aug. 22, 1933 |